June 23, 1936.   C. A. BREWER   2,045,516
MOTOR VEHICLE CONTROL
Original Filed Oct. 24, 1928   4 Sheets-Sheet 1

Inventor
Charles A. Brewer
By Worster & Davis
Attorneys

June 23, 1936.  C. A. BREWER  2,045,516

MOTOR VEHICLE CONTROL

Original Filed Oct. 24, 1928  4 Sheets-Sheet 2

Inventor
Charles A. Brewer
By Wooster & Davis
Attorneys

June 23, 1936.  C. A. BREWER  2,045,516

MOTOR VEHICLE CONTROL

Original Filed Oct. 24, 1928    4 Sheets-Sheet 3

Inventor
Charles A. Brewer
By Wooster & Davis
Attorneys

June 23, 1936.  C. A. BREWER  2,045,516
MOTOR VEHICLE CONTROL
Original Filed Oct. 24, 1928  4 Sheets-Sheet 4
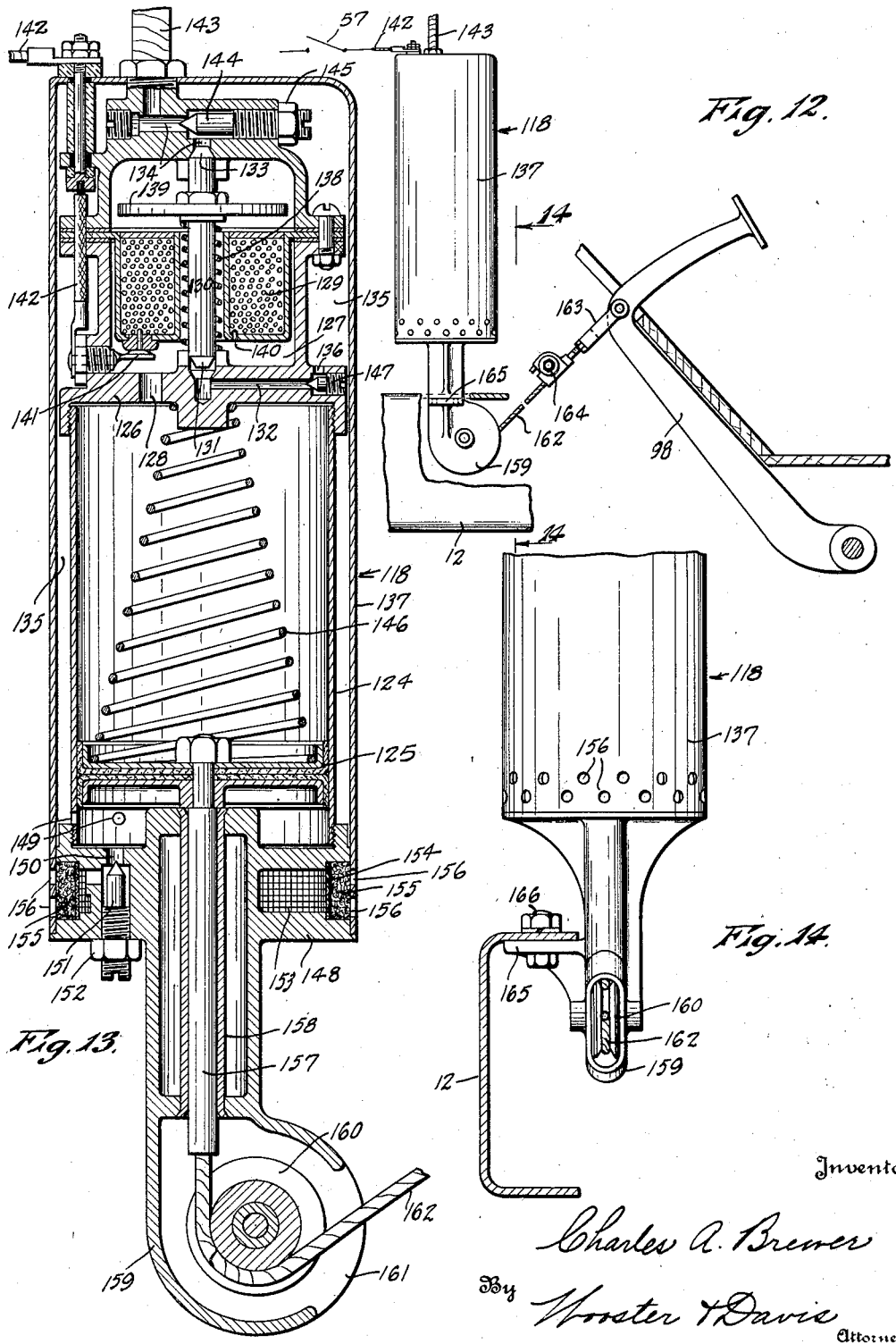
Inventor
Charles A. Brewer
By Wooster & Davis
Attorneys Patented June 23, 1936

2,045,516

UNITED STATES PATENT OFFICE 2,045,516

MOTOR VEHICLE CONTROL

Charles A. Brewer, Noroton Heights, Conn., assignor of one-half to Philip J. Kury Application October 24, 1928, Serial No. 314,627
Renewed November 28, 1933

9 Claims. (Cl. 192—4)

This invention relates to control mechanism for motor vehicles and has for an object to provide an improved control mechanism which will facilitate operation of the vehicle and provide power means for operating the various control means, and which will provide improved control means which will place the entire control in one hand of the operator.

It is also an object of the invention to provide a control mechanism which will give more complete, uniform and better control and thus tend to safer operation of the vehicle.

With the foregoing and other objects in view, the invention consists in certain novel features of construction, combinations and arrangements of parts as will be more fully disclosed in connection with the accompanying drawings. In these drawings, Fig. 1 is a somewhat diagrammatic top plan view of a chassis of an automobile showing my improved control applied thereto for controlling the operation of the clutch and brake mechanism.

Fig. 12 is a detail side elevation showing the application of a slightly different type of power unit for releasing the clutch or operating the brake.

Fig. 13 is a vertical section through the unit of Fig. 12, and

Fig. 14 is a transverse section substantially on line 14—14 of Fig. 12 on a somewhat larger scale indicating how the unit may be secured to the frame.

Figure 1:
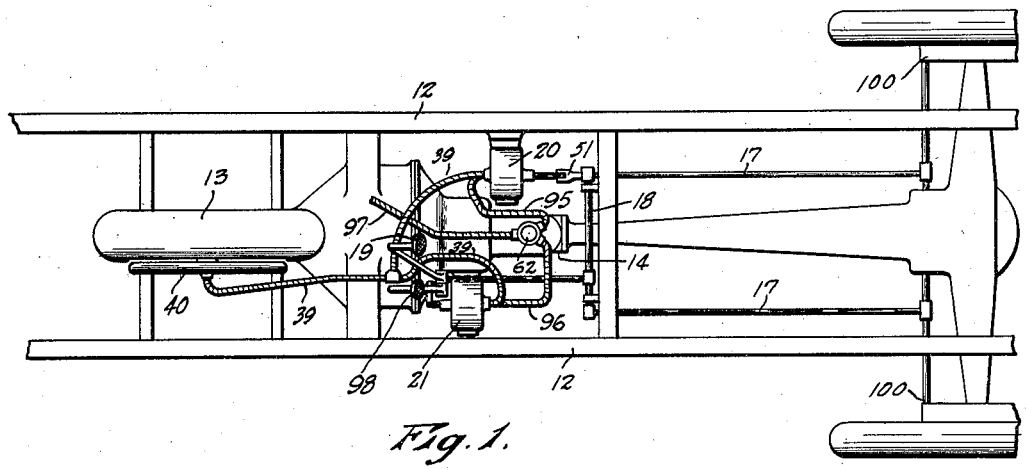

Referring first to Figs. 1 to 7, a frame of a motor vehicle is indicated at 12 with the motor at 13 and the selective gear transmission at 14 controlled by the gear shift lever 15 in the usual manner. Any suitable type of clutch 16 is provided between the motor and transmission, and the brake mechanism is shown diagrammatically at 17 and 18 operated by a foot pedal 19 and a power device 20, a similar power device 21 being connected to the clutch for releasing the same.

Figure 7:
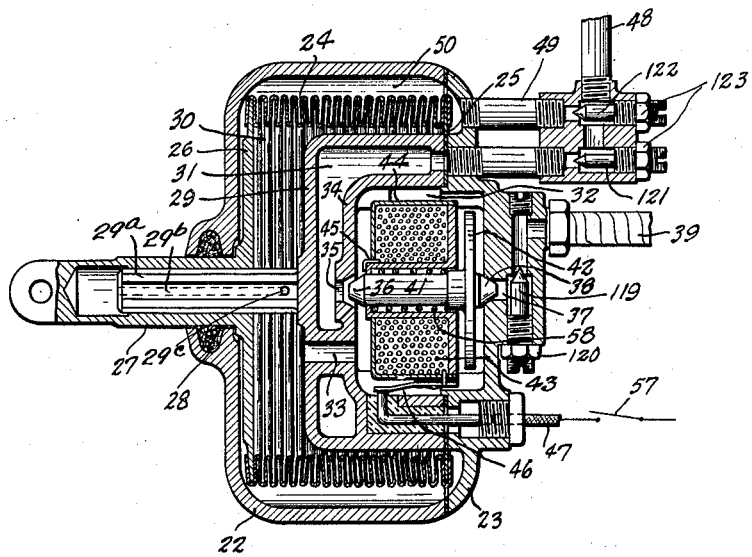
Fig. 7 is a detail section of the preferred form of power unit.
Figure 8:
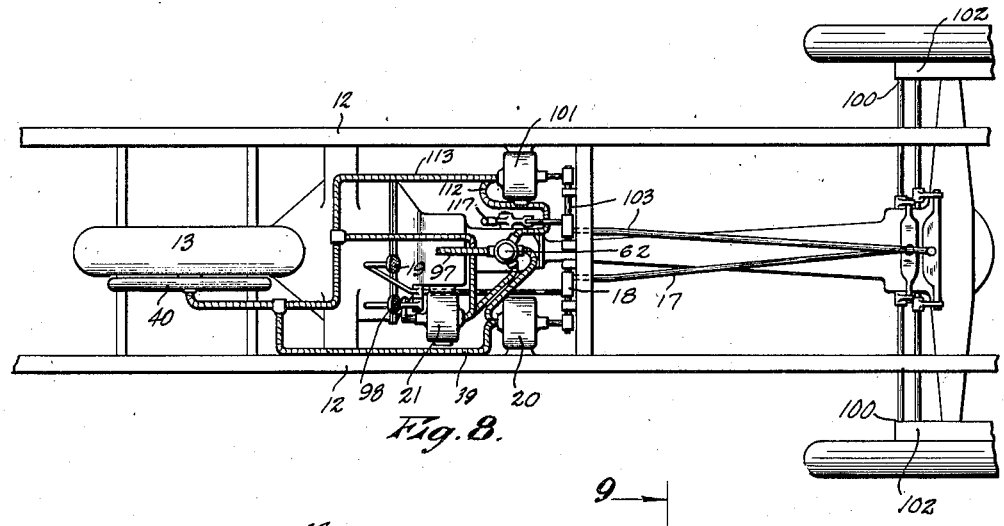
Fig. 8 is a top plan view similar to Fig. 1 showing my improved control installed for operation of the emergency brake as well as the service brake and clutch.

These power units may be substantially the same as that shown in Fig. 7 which is substantially that disclosed in my copending application Serial No. 304,853, filed September 10, 1928, or it may be of the construction shown in Figs. 12 to 14, although I am not limited to the use of these particular forms of unit.

The brake and clutch devices may be operated either by a suction unit, or a unit which is operated by pressure greater than atmospheric pressure. The particular units 20, 21, 101 and 118, illustrated are operated by a suction from any suitable source as the intake manifold of the engine. The specific construction of units 20, 21 and 101 is illustrated in Fig. 7. It comprises an outer casing or cylinder made in two sections, the body section 22 and the cap or cover section 23 connected together by suitable screws. Secured to the cover section at one end is a flexible diaphragm 24, the particular diaphragm shown being a metal bellows construction and is secured to the cover by means of the packing disc 25. The other end of the bellows is closed by a movable head or piston 26 which has an extension or piston rod 27 passing through the end wall of the body member 22, and it may be surrounded with a suitable packing 28 to prevent entrance of dirt and moisture. Also secured to the section 23 is an extension 29 projecting into the space 30 within the diaphragm to help fill this space and reduce the amount of air contained therein to be withdrawn by the suction when the device is operated and thus reduce the lag in its operation and give quicker functioning of the unit. It also provides convenient means for mounting the control valve mechanism. This extension is double walled to provide a passage 31 and it also forms a chamber 32 communicating with the space 30 through one or more conduits 33. The inner wall 34 of the extension has a passage 35 forming communication between the chamber 32 and the passage 31 which is controlled by a movable valve 36. The cap 23 has a passage 37 leading to the chamber 32 which is controlled by a valve 38, and this passage 37 is connected by a suitable flexible conduit 39 with any suitable source of suction such as the intake manifold 40 of the motor. The effective area of the passage 37 may be adjusted and set by the valve 119 which may be secured in adjusted position by lock nut 120. The two valves 36 and 38 are mounted on a rod 41 so that they move together. This rod and its head 42 form the armature of a solenoid 43 which surrounds the rod and is mounted in any suitable casing 44. One end of this solenoid is grounded, as shown at 45, and the other end leads through an insulated contact 46 to an insulated conductor 47. The passage 31 is connected through a suitable conduit 48 with the atmosphere, and a branch 49 communicates with the space 50 outside the diaphragm 24. The effective area of these two branches may be controlled by the adjustable valves 121 and 122 respectively. The valves after adjustment are secured in adjusted position by lock nuts 123. The extension 27 is connected by any suitable connection to the mechanism to be operated, such as a brake or a clutch. In Fig. 1 this extension on unit 20 is connected by the link 51 with the rod 18 for operating the service brake 100 and the extension 27 of unit 21 is connected to an operating lever 52 (Fig. 5) for releasing the clutch 16. This lever may be pivoted to the frame or clutch housing at 53 and operate through the sleeve 54 on the clutch shaft. The units 20 and 21 are mounted by any suitable support but are preferably pivoted by suitable trunnions, as shown at 55 (Fig. 5), on the casing of the unit and mounted in a suitable bracket 56 secured to the frame or other suitable part of the vehicle. This pivotal mounting for the unit permits it to rock if necessary when it is operated.

This unit operates from the suction of the motor or any suitable source when a control switch indicated diagrammatically at 57 (Fig. 7) is closed. Electric current from any suitable source to which conductor 47 is connected energizes the solenoid 43 and shifts the rod 41 carrying the valves 36 and 38 to the left, as viewed in Fig. 7, against action of the spring 58 surrounding the rod 41. This closes the passage 35 and opens the passage 37 permitting the suction to withdraw air from the space 30 within the diaphragm 24 and reducing the pressure therein. This causes atmospheric pressure on the head 26 to force the same to the right, as viewed in Fig. 7, shifting the extension 27 and operating any mechanism to which this extension is connected. When the switch 57 is opened the solenoid is de-energized permitting the spring 58 to shift the valves 36 and 38 to the right, as viewed in Fig. 7, thus closing passage 37 and opening passage 35. This permits atmospheric pressure to enter the space 30 within the diaphragm 24, thus equalizing pressures on opposite sides of this diaphragm and permitting the head 26 with the extension 27 to move back to its original position either under the spring action of the diaphragm or a suitable spring on the mechanism operated thereby.

By proper adjustment of valves 119, 121 and 122, the unit shown is adapted for use for either brake or clutch operation. When used to apply the brakes, the gradual application desired may be obtained by adjustment of valve 119 toward closed position, to insure that the braking force will not be applied too rapidly when valve 38 is opened. Valves 121 and 122 are adjusted toward full open position to insure quick release of the brakes when the solenoid is de-energized.

The unit for controlling the clutch will require an adjustment of the valves which will insure rapid return movement of the piston member 26 and the controlled clutch surfaces toward engaged position, and a retarded movement at, and for a brief time subsequent to, the time the friction surfaces of the clutch engage. For this purpose valve 122 is adjusted toward closed position while valve 121 is adjusted toward open position. When suction is introduced into the right-hand end of the cylindrical casing 22, 23, rod 27 and piston member 26 will be moved to the right to disengage the clutch surfaces against the tension of the clutch spring, the speed of this movement being controlled by the adjustment of valve 119. When the solenoid is de-energized, air flows into the right-hand end of the cylinder 22, 23 past valve 121 and the driven clutch surfaces are rapidly moved toward engaged position by means of the clutch spring. This rapid movement tends to decrease the air pressure acting on the right-hand face of piston member 26. The port for valve 122 has been sufficiently restricted to insure that the rapid movement of the piston member to the left will compress the air in the left-hand end of the cylinder, so that member 26 will have its speed of movement materially reduced at the instant the clutch surfaces engage. The pull of the clutch spring is rendered substantially ineffective at the instant of clutch surface engagement, due to the resistance offered by said engagement plus the compression resistance in the left-hand end of the cylinder, and to a certain extent by the reduced pressure in the right-hand end of the cylinder. As air is expelled past valve 122, the compression is destroyed and equalized with the pressure on the right face of the piston, and the clutch surfaces are slowly and completely engaged. If it is desired to operate the clutch and brake manually and without the use of the power unit, valve 119 is completely closed.

Secured to the extension 29 is a rod 29a which is exteriorly splined to engage corresponding splines formed interiorly of the hollow piston rod 27. Rod 29a is provided with a longitudinal passage 29b extending from the left-hand end thereof to radial passage 29c which opens into space 30. The rod 29a thus acts as a guide for the piston rod 27 and passages 29b and 29c act as a bleed for air trapped in said rod. When suction is introduced into chamber 30, piston 26 moves to the right and covers the radial passage 29c before the piston reaches the end of its travel. The air remaining in the hollow rod 27 is now trapped and compressed to provide a cushion which resists further movement of piston 26 to the right.

The control for the two units 20 and 21 for operating the service brake and clutch respectively is mounted on the gear shift lever 15. This lever is mounted on a suitable housing 59 in the usual manner to permit the required movements for shifting the gears, and has the usual extension 60 connected to the gear shift mechanism. This lever has a longitudinal passage 61 for electrical conductors or other control means for the units. The lever is provided at its upper end with a grip 62 in the shape of a ball or knob of insulating material. Mounted in this grip and projecting from the upper end thereof is an insulating button 63 which is mounted for limited sliding movement in the grip and as shown is movable longitudinally of the axis of the lever. A spring 64 reacting against this button and a permanently mounted disc 65 tends to force this button upwardly, which movement is limited by a shoulder 66. The button carries a metal contact 67 which when in its depressed condition engages and bridges the two contacts 68 and 69. These contacts are carried on suitable posts 70 and 71 respectively mounted in the grip and to which are connected the lead wires 72 and 73 respectively. One of these lead wires, as the lead wire 72, is connected to a suitable source of current, such as the battery or generator of the vehicle, while the other conductor 73 leads to the brake operating unit 20. Therefore, the conductor 73 corresponds to the conductor 47 in Fig. 7 and the switch 67, 68, 69 corresponds to the switch 57 of Fig. 7. It will, therefore, be obvious that when the button 63 is depressed the circuit to the brake unit 20 will be closed causing this unit to function to apply the brakes.

Also mounted on the grip 62 is a control switch for the unit 21 for releasing the clutch. This switch is mounted in the side of the grip so that it may be closed by pressing inwardly on the sides thereof. In the form shown it comprises a resilient ring 74 mounted in a suitable groove 75 in the grip, this ring being split as shown at 76. It is connected through the insulating elements 77 with the switch levers 78 and 79. The lever 78 is pivoted on the stud 70 while the lever 79 is pivoted on a suitable stud 80 from which a conductor 81 leads through the lever passage 61 to the unit 21. The two levers 78 and 79 are movable toward each other at their free ends where they carry switch contacts 82 and the levers are held normally separated by the springs 83. Therefore, the conductor 81 corresponds to the conductor 47 in Fig. 7 while the switch 82 corresponds to the control switch 57 in Fig. 7. It will, therefore, be apparent that when the ring 74 is compressed the switch 82 is closed closing the circuit to the unit 21 which will release the clutch. When the ring 74 is released switch 82 is opened permitting the clutch to engage. The grip or knob 62 is mounted on the free end of the gear shift lever 15 by any suitable means, such as screws 83 passing through the cupped flange 84 threaded or otherwise secured on the lever.

Figure 5:
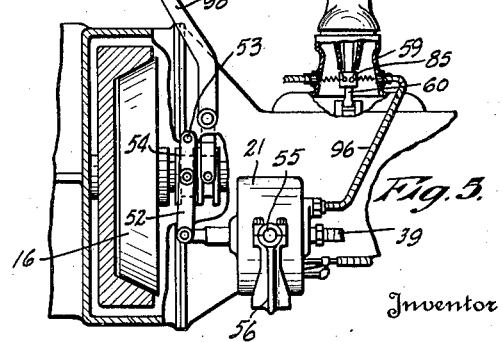
Fig. 5 is a partial side elevation and partial vertical section showing the gear shift lever and the power device for releasing the clutch.
Figure 6:
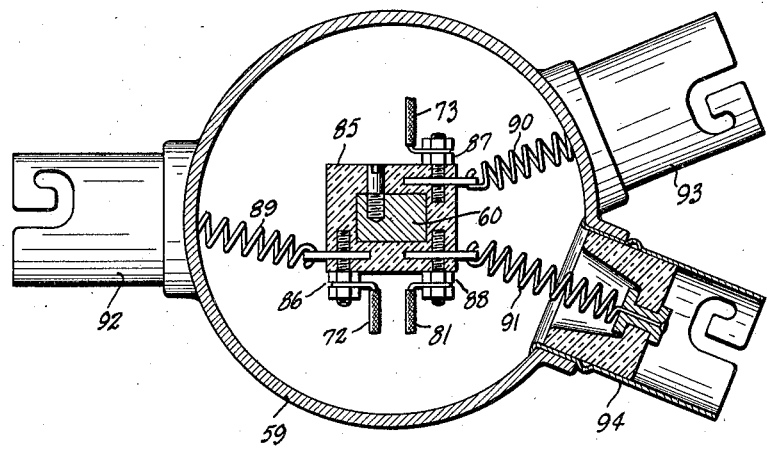
Fig. 6 is a detail transverse section of a lower portion of the gear shift lever and the mounting therefor.

The connections from the conductors 72, 73 and 81 are preferably made, as shown in Figs. 5 and 6. For this purpose an insulating block 85 is mounted on the extension 60 of the lever and the conductors 72, 73 and 81 are connected to binding posts 86, 87 and 88 respectively, mounted on this block. Flexible coil conductors 89, 90 and 91 lead from these binding posts respectively to suitable sockets 92, 93 and 94 respectively, mounted on the support 59 from which they are connected by suitable conductors in armored flexible conduits to the various units and the battery or other source of current. The flexible conduit to the unit 20 is shown at 95 and is connected to the socket 93 by a suitable detachable connection. The conduit 96 leads to the unit 21 and is connected by a suitable detachable connection to the socket 94, while the conduit 97 is connected by a suitable detachable connection to the socket 92 and is connected to the battery or other suitable source of current, not shown.

Although the service brake is applied and the clutch is released by the power units the usual pedal operating means for applying the brake and releasing the clutch, shown at 19 and 98 respectively, are retained and these two pedals operate in the usual manner for applying the service brake and releasing the clutch. Thus if either of the units 20 or 21 fail the brake may be applied or the clutch released in the manner now generally employed, or both of these pedals may be used if desired, for supplementing the action of the units 20 and 21. If the operator wishes to control the brake and clutch by the feet as is now general practice he may do so independently of the power units 20 and 21, or he may use the brake pedal to assist the power unit 20 and thus increase the braking effect.

However, in normal operation when the operator wishes to apply the brake he may merely rest his hand on top of the grip 62 to thus depress the button 63 which will apply the service brake. He may then press inwardly on the ring 74 and release the clutch, after which he may by manipulating the lever 15 in the usual manner shift the gears as desired, or if preferred he may release the clutch without applying the brake and then shift the gears in the usual manner. It will, therefore, be obvious that this mechanism places the entire control of the car in one hand of the operator, but he may if desired, apply the brakes and release the clutch with the foot pedals in the usual manner. As it is the natural action of the hand to grip the sides of the knob 62 in shifting gears the natural and practically unconscious action will be with this device to first release the clutch and then shift the gears. The natural action, therefore, is always to release the clutch before shifting the gears, and this device, therefore, tends to reduce and practically eliminate the liability of grinding the gears when shifting. It will also be obvious that practically no effort is required on the part of the operator in applying the brake, and as the brake unit 20 may be set by suitably designing the various air inlets to operate uniformly or by adjusting the valves 119, 121 and 122 the brakes are never set with a too sudden action but are always applied uniformly, thus reducing sudden strains on the vehicle and tending to more comfortable operation with less fatigue to the occupants. The unit 21 also gives uniform engagement of the clutch, the speed of engagement being controlled and set by the valves 121 and 122, preventing too sudden engagement, eliminating sudden jerks incident to too rapid engagement of the clutch and reducing strains on the car and fatigue to the occupants. In other words the entire installation tends to more uniform and proper operation of the vehicle.

Figure 2:
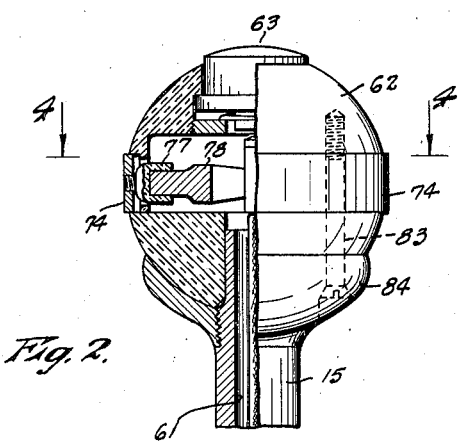
Fig. 2 is a partial side elevation and partial section of the upper end of the gear shift lever.
Figure 3:
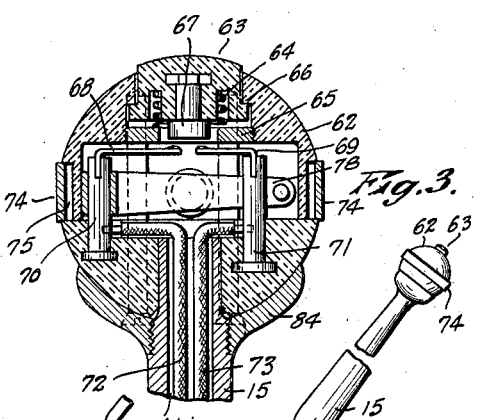
Fig. 3 is a vertical section of this end of the lever taken substantially at right angles to the plane of the section of Fig. 2, the section being substantially on line 3—3 of Fig. 4.
Figure 4:
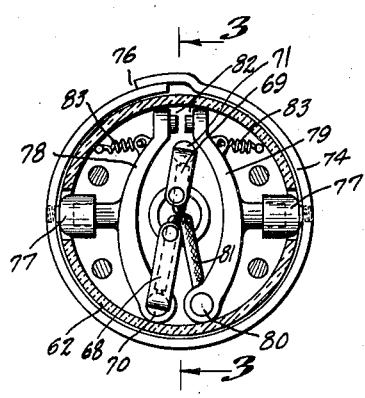
Fig. 4 is a transverse section substantially on line 4—4 of Fig. 2.
Figures 9, 10:
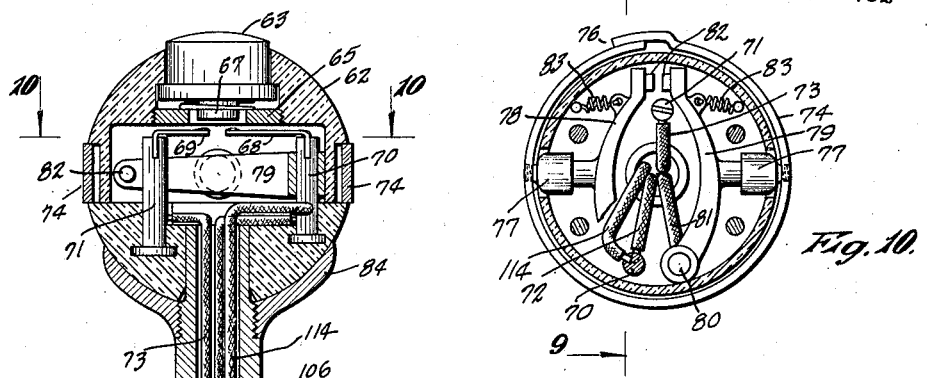
Fig. 9 is a vertical section of the upper end of the gear shift lever showing the controls as employed with the layout of Fig. 8, the section being substantially on line 9—9 of Fig. 10.
Fig. 10 is a transverse section substantially on line 10—10 of Fig. 9.
Figure 11:
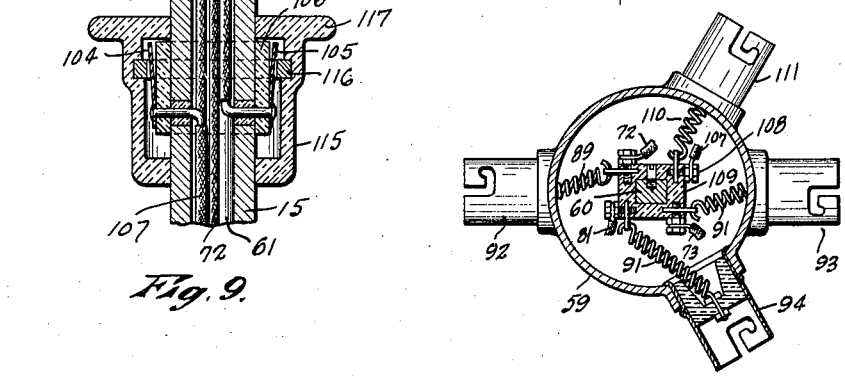
Fig. 11 is a transverse detail section of the lower end of the gear shift lever and the mounting therefor used in connection with the layout of Fig. 8.

In Figs. 8, 9, 10 and 11 I have shown the same principles applied to a vehicle to control the emergency brake as well as the service brake and the clutch. In this construction the control for the service brake, indicated at 100, is the same as that of Figs. 1 to 6, while there is a separate unit 101 for operating the emergency brake indicated diagrammatically at 102. This unit 101 may be of the same type and construction as the units 20 and 21 for the service brake and the clutch. It, however, may be somewhat stronger than the unit 20 for applying the service brake. That is, the unit 20 may be designed so that it cannot lock the wheels through the service brake, but if desired, the unit 101 may be designed of sufficient power to lock the emergency brake when it is applied. Of course, the design will be controlled by the operation desired. The unit 101 is connected through the link mechanism 103 with the emergency brake while the unit itself is controlled by a third switch on the gear shift lever 15. This switch is shown in Fig. 9 and includes a pair of spring contacts 104 and 105 mounted by suitable insulating supports as an insulating block 106 on the lever. The contact 104 is connected through a conductor 107 passing through the lever to a binding post 108 on the insulating block 109 corresponding to the insulating block 85 of Fig. 6, and a flexible conductor 110 is connected by the detachable connection 111 through a flexible conduit 112 with the unit 101. Suction from the intake manifold or other suitable source of suction is supplied through a flexible conduit 113 corresponding to the conduit 39 in Fig. 7. The switch element 105 is connected by a conductor 114 with the post 70 which, as indicated in Figs. 2, 3 and 4, is connected to any suitable source of current. Mounted to slide on the exterior of the lever is an insulating sleeve 115 which carries a metal ring 116 on the inner side thereof. This sleeve 115 is mounted to move longitudinally on this lever and is normally held by its own weight in its lower position resting on top of the block 106. If the weight is insufficient a spring may be used for this purpose. The sleeve has a flange 117 and the sleeve is mounted immediately below the grip or knob 62 so as to be easily engaged by the fingers of the operator when the hand is on the grip. The operator may while the hand is on the grip draw up the sleeve 115 bringing the conductor ring 116 into engagement with the contacts 104 and 105. This will close the circuit through the unit 101 and apply the emergency brake. It will, of course, be understood that as soon as the sleeve 115 is released it will move downwardly, breaking the circuit to the unit 101 and causing the emergency brake to be released. Thus in this arrangement the service brake, the emergency brake and the clutch are all controlled from the gear shift lever, and may be controlled by one hand of the operator while this hand is on the gear shift lever. Although the emergency brake may be applied by the power unit 101 the usual hand lever 117 is also provided for applying the emergency brake the same as is now general practice. This hand lever may be used to apply the emergency brake independently of the unit 101, and therefore, the emergency brake may be applied by hand while the car is in motion or may be used as is now common practice to secure the car when it is parked.

In Figs. 12 to 14, I have shown in detail a somewhat different type of power means which may be applied to operate the clutch or brakes in the same manner as the unit shown in Fig. 7. This unit functions in substantially the same manner as the unit shown in Fig. 7 except that the movable power element is a piston instead of a diaphragm and it is connected to the brake or clutch in a somewhat different manner. It may be connected somewhat more readily directly to the clutch or brake pedal, thus adapting it to be applied somewhat more readily to existing installations. The unit comprises a cylinder 124 in which is mounted a reciprocating piston 125. The upper end of the cylinder is closed by a head 126 which has a chamber 127. The interior of the cylinder 124 above the piston communicates with the chamber 127 through the passage 128. Mounted in this chamber 127 is a solenoid 129 corresponding to the solenoid 43 of the unit of Fig. 7, and this solenoid surrounds a rod 130 carrying at one end a valve 131 controlling a passage 132, and at its other end carrying a valve 133 controlling a passage 134. The passage 132 forms a communication between the chamber 127 and the space 135 outside the cylinder, which communication with this space is shown at 136. The entire internal structure comprising the cylinder 124 and the head 126 with associated elements is enclosed within an outer casing 137 which thus forms the chamber 135. The rod 130 is surrounded by a spring 138 which tends to move the rod 130 and the valves carried thereby upwardly to close the valve 133. The rod 130 and the head 139 forms the armature for the solenoid 129 and this solenoid when energized tends to shift the rod 130 against the action of the spring 138. One end of the solenoid is grounded as shown at 140, and the other end is connected by a contact 141 to a lead 142 leading to any suitable control switch, such as any switch corresponding to the switch 57 of Fig. 7. That is, the lead 142 corresponds to either of the leads 95 or 96 of Fig. 1.

The passage 134 leads to the chamber 127 and is connected by a flexible conduit 143 to any suitable source of suction, such as the intake manifold 40 of the motor 13. This connection 143, therefore, corresponds to the connection 39 of the unit shown in Fig. 7. The effective area of the passage 134 may be adjusted and determined by an adjustable valve 144 which may be secured in adjusted position by a lock nut 145.

A coil spring 146 is mounted between the upper side of the piston 125 and the head 126 so that it tends to force the piston downwardly. The spring is preferably conical so that it may collapse into a shorter space and its use insures that the piston will be moved to the end of the cylinder whereby the usual clutch lever spring is effective to move said lever to such a position as to prevent wear in the clutch trunnion bearing. The effective area of passage 132, 136 may be determined by an adjustable valve 147.

The lower end of the cylinder 124 is closed by a head 148 and this head also closes the lower end of the casing 137. The space in the cylinder below the piston 125 communicates with the space 135 outside the cylinder through one or more openings 149 in the wall of the cylinder. The space in the cylinder below the piston also communicates with the outer atmosphere through a passage 150 the effective area of which may be adjusted and determined by an adjustable valve 151 which is secured in adjusted position by a lock nut 152. In the construction shown the passage 150 leads to an annular chamber 153 in the head 148 which is closed by a screen 154 and a fibre packing 155 which is mounted between this screen and the casing 137, the casing being provided with suitable openings 156 leading to this fibre packing or screen. The fibre is sufficiently loose to permit entrance and exit of air but forms a screen or strainer to prevent entrance of dust and dirt to the mechanism in the casing.

The piston 125 is connected to a piston rod 157 mounted for sliding movement in a bearing sleeve 158 carried by the head 148, and this head is also extended to provide an enclosed bearing 159 for a pulley 160. The bearing casing 159 is open at one side as shown at 161, for passage of a flexible connection, such as a wire cable 162, which passes over the pulley 160 and is connected to the piston rod 157. At its other end this table is connected through a suitable link 163 with the clutch pedal 98, or if desired, it may be connected to the brake pedal 19 in the same manner. There may be an adjustable connection 164 in the cable to adjust it to the proper length and take up slack. The extension of the head 148 also includes a side bracket 165 providing means by which the unit may be mounted on the side member 12 of the car frame by any suitable means, such as the bolts 166.

This unit operates in substantially the same manner as the unit of Fig. 7. That is, closing the switch 57 corresponding to either the switch controlled by button 63 or ring 74, or any other suitable control switch, energizes the solenoid 129. This shifts the valves 131 and 133 downwardly closing the passage 132 to the atmosphere and opening the passage 134 leading to the source of suction, as the intake manifold. This suction reduces the pressure in the cylinder 124 above the piston and draws the piston upwardly, or rather the piston is forced upwardly by the pressure of the external atmosphere on the under side of the piston. This action, of course, will draw down the pedal to which the cable 162 is connected either releasing the clutch or applying the brake depending onto which element the unit is connected. When the switch 57 is opened the valves 131, 133 are forced upwardly under action of the spring 138, thus closing the passage 134 to the suction and opening the passage 132 to the atmosphere. This provides pressure on both sides of the piston permitting the spring 146 to force the piston downwardly and permit the clutch to engage or the brakes to release. The speed of operation of the piston under the action of the suction may be controlled by adjusting the valve 144. It, therefore, determines the rate at which the pressure is reduced above the piston. The speed of movement of the piston may also be controlled or determined by adjusting the valve 151. The valves 151 and 147 by controlling entrance of atmospheric air also determine the speed at which the clutch may be engaged or the brake released.

With this type of unit it is somewhat easier to secure a greater stroke than with the diaphragm unit of Fig. 7. It can, therefore, be attached to the brake or clutch lever a considerable distance from the pivot for this lever as indicated in Fig. 12, and it will give the necessary movement for properly operating the lever. This gives greater leverage so that a smaller unit of less power may be used. The unit can be attached to cars already assembled and in service if desired. The flexible cable 162 permits operation of the pedal by the foot of the operator independently of the unit.

Having thus set forth the nature of my invention, what I claim is:

1. In a motor vehicle having a selective gear transmission, a lever for shifting the gears, a clutch between the motor and the transmission, and a brake mechanism, independent power means for operating the brake mechanism and releasing the clutch respectively, an independent electrical control for each power means, a support for the lever, a hand grip for manipulating the lever, independent hand operated switches associated with said grip, the lever and switches each operable entirely independently of each other, electrical connections on the lower part of the lever in said support, conductors leading from the switches to said connections, sockets on the lever support, flexible conductors from said connections to the sockets, and flexible conductors detachably connected to said sockets and leading to the respective power means.

2. In a motor vehicle having a selective gear transmission, a service brake, an emergency brake, and a clutch between the motor and the transmission, a lever for shifting the gears, independent power means for operating the respective brakes and releasing the clutch, a hand grip on the lever for manipulating it, and independent hand operated control means associated with said grip for controlling the respective power means and all operable by the hand while it is on said grip.

3. In a motor vehicle having a selective gear transmission, a service brake, an emergency brake, and a clutch between the motor and the transmission, a lever for shifting the gears, independent power means for operating the respective brakes and releasing the clutch, a hand grip on the lever for manipulating it, electrical control means for the respective power means, and a plurality of switches associated with the hand grip for controlling said electrical control means, the switch operating means for the service brake being at the upper end of the grip and movable longitudinally of its axis, the switch operating means for the clutch being at one side of and forming a part of the grip and movable transversely of its axis, and the switch operating means for the emergency brake being movable longitudinally of the axis of the grip and located below the grip where it may be manipulated by the fingers when the hand is on the grip.

4. Control mechanism for motor vehicles having a brake, a clutch, and a transmission, power means for operating the brake, power means for operating the clutch, a lever for said transmission, and independently operable control means for said brake and clutch operating power means mounted on said lever, the control means for said clutch operating power means being contractible for effecting operation thereof to disengage the clutch.

5. In a motor vehicle of the type having a clutch, a brake, a transmission and a gear shift lever for the transmission, the combination therewith of power means for operating the brake, power means for operating the clutch, control means for the brake power means mounted on said lever, and control means for the clutch power means mounted on the lever and adapted for operation independently of, or simultaneously with, the first-named control means.

6. In a motor vehicle having a selective gear transmission, a service brake, and a clutch between the motor and the transmission, the combination therewith of a lever for shifting the gears, independent power means for operating the brake and for releasing the clutch, a hand grip on the lever for manipulating the same, and independent hand operated control means housed in said grip for controlling the respective power means and all operable by the hand while it is on said grip.

7. In a motor vehicle having a selective gear transmission, a clutch, a brake, and a gear shift lever for the transmission, the combination therewith of fluid pressure power means for operating the brake, fluid pressure power means for operating the clutch, control means for said first named power means mounted on said lever, control means for said second named power means mounted on said lever, said first and second named control means being operable independently of each other, and adjustable valve means independent of said control means for automatically controlling the fluid pressure in said second named power means to vary the resistance of the latter to the engaging movement of the clutch.

8. Control mechanism for motor vehicles comprising a clutch, a brake, a transmission, a lever for shifting the gears in said transmission, power means for operating the brake, power means for operating the clutch, control means for said clutch operating means and control means for said brake operating means both mounted on said lever, contractible means associated with said lever for actuating said first named control means, and a depressible member on said lever for actuating said second named control means independently of said contractible means.

9. Control mechanism for motor vehicles comprising a clutch having a normal bias to engaged position, a brake, a transmission, a gear shift lever for the latter, fluid pressure power means for actuating the clutch, fluid pressure power means for actuating the brake, control means mounted on the gear shift lever for rendering said first named power means operative to disengage the clutch and releasable to permit the clutch to return to engaged position, valve means for controlling the fluid pressure in said first named power means to vary the resistance of the latter to the engaging movement of said clutch, and control means for said brake operating power means mounted on the gear shift lever independently of said first named control means, both of said control means being operable by one hand of the operator while shifting said lever.

CHARLES A. BREWER.